(12) United States Patent
Yanagitani et al.

(10) Patent No.: US 11,053,166 B2
(45) Date of Patent: Jul. 6, 2021

(54) TRANSPARENT RARE EARTH ALUMINUM GARNET CERAMICS

(71) Applicant: Konoshima Chemical Co., Ltd., Osaka (JP)

(72) Inventors: Takagimi Yanagitani, Mitoyo (JP); Hoshiteru Nozawa, Mitoyo (JP); Hideki Yagi, Mitoyo (JP)

(73) Assignee: Konoshima Chemical Co., Ltd., Osaka (JP)

( * ) Notice: Subject to any disclaimer, the term of this patent is extended or adjusted under 35 U.S.C. 154(b) by 25 days.

(21) Appl. No.: 16/565,007

(22) Filed: Sep. 9, 2019

(65) Prior Publication Data

US 2020/0002233 A1    Jan. 2, 2020

Related U.S. Application Data

(62) Division of application No. 15/745,953, filed as application No. PCT/JP2016/071025 on Jul. 15, 2016, now Pat. No. 10,494,307.

(30) Foreign Application Priority Data

Aug. 27, 2015  (JP) ................................ 2015-167374

(51) Int. Cl.
| | |
|---|---|
| *C04B 35/44* | (2006.01) |
| *C04B 35/50* | (2006.01) |
| *G02F 1/09* | (2006.01) |
| *C04B 35/638* | (2006.01) |
| *C04B 35/626* | (2006.01) |
| *C04B 35/64* | (2006.01) |

(52) U.S. Cl.
CPC .............. *C04B 35/44* (2013.01); *C04B 35/50* (2013.01); *C04B 35/638* (2013.01); *G02F 1/09* (2013.01); *C04B 35/6263* (2013.01); *C04B 35/62605* (2013.01); *C04B 35/62625* (2013.01); *C04B 35/62695* (2013.01); *C04B 35/64* (2013.01); *C04B 2235/3222* (2013.01); *C04B 2235/3224* (2013.01); *C04B 2235/3225* (2013.01); *C04B 2235/3418* (2013.01); *C04B 2235/656* (2013.01); *C04B 2235/6562* (2013.01); *C04B 2235/6565* (2013.01); *C04B 2235/6567* (2013.01); *C04B 2235/6581* (2013.01); *C04B 2235/74* (2013.01); *C04B 2235/764* (2013.01); *C04B 2235/77* (2013.01); *C04B 2235/785* (2013.01); *C04B 2235/786* (2013.01); *C04B 2235/9646* (2013.01); *C04B 2235/9653* (2013.01)

(58) Field of Classification Search
CPC ..... C04B 35/44; C04B 35/111; C04B 35/115; C04B 35/50
See application file for complete search history.

(56) References Cited

U.S. PATENT DOCUMENTS

| | | | | |
|---|---|---|---|---|
| 6,200,918 | B1 ‡ | 3/2001 | Yanagitani ............ | H01J 61/302 501/15 |
| 7,253,129 | B2 ‡ | 8/2007 | Takagimi ................ | C04B 35/44 264/663 |
| 10,494,307 | B2 * | 12/2019 | Yanagitani ............ | C04B 35/638 |
| 2005/0157219 | A1 ‡ | 7/2005 | Sekijima ................ | C30B 13/24 349/25 |
| 2005/0215419 | A1 ‡ | 9/2005 | Takagimi ................ | C04B 35/44 501/152 |
| 2009/0108507 | A1 ‡ | 4/2009 | Messing ................ | C04B 35/44 264/60 |
| 2010/0048378 | A1 ‡ | 2/2010 | Tang ...................... | B82Y 30/00 501/13 |
| 2010/0193738 | A1 ‡ | 8/2010 | Peuchert ................ | B82Y 30/00 252/30 |
| 2012/0018673 | A1 ‡ | 1/2012 | Raukas .............. | C09K 11/7774 252/30 |
| 2013/0034715 | A1 ‡ | 2/2013 | Peng ................... | C04B 35/6261 428/22 |

(Continued)

FOREIGN PATENT DOCUMENTS

| | | | | |
|---|---|---|---|---|
| EP | 0748780 | A1 * | 12/1996 | ........... C04B 35/115 |
| EP | 2826835 | A1 ‡ | 1/2015 | |

(Continued)

OTHER PUBLICATIONS

Geho, Mikio et al., "Growth of terbium aluminum garnet (Tb3ASO12; TAG) single crystals by the hybrid laser floating zone machine" Journal of Crystal Growth, 2004, pp. 188-193, vol. 267.‡

International Search Report for PCT/JP2016/071025 dated Aug. 16, 2016.‡

Chong, Chen et al., "Optimization of CeO2 as sintering aid for Tb3Al5O12 Faraday magneto-optical transparent ceramics" Journal of Materials Science, 2015, pp. 2517-2521, vol. 50.‡

International Preliminary Report on Patentability for PCT/JP2016/071025 dated Feb. 27, 2018.‡

Supplementary European Search Report for EP 16838965 dated Dec. 11, 2018.‡

Chong, C., et al., Optimization of CeO₂ as Sintering Aid for Tb₃Al₅O₁₂ Faraday Magneto-Optical Transparent Ceramics, Journal of Materials Science 50:2517-2521, 2015.

(Continued)

*Primary Examiner* — Karl E Group

(74) *Attorney, Agent, or Firm* — Knobbe, Martens, Olson & Bear LLP

(57) ABSTRACT

Provided is a transparent rare earth aluminum garnet ceramic that has a highlight transmission rate and can be mass produced. The transparent rare earth aluminum garnet ceramic is represented by general formula $R_3Al_5O_{12}$ (R is an element selected from the group consisting of rare earth elements having an atomic number of 65 to 71) and includes Si and Y as sintering aids, or is represented by general formula $R_3Al_5O_{12}$ (R is an element selected from the group consisting of rare earth elements having an atomic number of 65 to 70) and includes Si and Lu as sintering aids.

1 Claim, No Drawings

(56) References Cited

U.S. PATENT DOCUMENTS

2015/0021485 A1‡ 1/2015 Hayashi ............... A61B 6/03
    250/36
2015/0364548 A1‡ 12/2015 Miyazawa ............ H01L 29/16
    428/141

FOREIGN PATENT DOCUMENTS

| JP | 11-255559 A | ‡ | 9/1999 |
| JP | 2004002137 A | * | 1/2004 |
| JP | 2008-007385 A | ‡ | 1/2008 |
| JP | 4107292 B2 | ‡ | 6/2008 |
| JP | 2008-195570 A | ‡ | 8/2008 |
| JP | 2009-084060 A | ‡ | 4/2009 |
| JP | 2010-235388 A | ‡ | 10/2010 |
| JP | 2015-030662 A | ‡ | 2/2015 |
| WO | WO 2008/134418 A1 | ‡ | 11/2008 |
| WO | WO 2009/038674 A2 | ‡ | 3/2009 |
| WO | WO 2013/003700 A2 | ‡ | 1/2013 |

OTHER PUBLICATIONS

Geho, M., et al., Growth of Terbium Aluminum Garnet ($Tb_3Al_5O_{12}$; TAG) Single Crystals by the Hybrid Laser Floating Zone Machine, Journal of Crystal Growth 267:188-193, 2004.

International Preliminary Report on Patentability received in International Patent Application No. PCT/JP2016/071025 dated Feb. 27, 2018.

International Search Report received in International Patent Application No. PCT/JP2016/071025 dated Aug. 16, 2016.

\* cited by examiner
‡ imported from a related application

TRANSPARENT RARE EARTH ALUMINUM GARNET CERAMICS

CROSS-REFERENCE TO RELATED APPLICATIONS

This application is a divisional of U.S. patent application Ser. No. 15/745,953, filed on Jan. 18, 2018, now U.S. Pat. No. 10,494,307; which is a U.S. National Phase Application of PCT International Application Number PCT/JP2016/071025, filed on Jul. 15, 2016, designating the United States of America and published in the Japanese language, which is an International Application of and claims the benefit of priority to Japanese Patent Application No. 2015-167374, filed on Aug. 27, 2015. The disclosures of the above-referenced applications are hereby expressly incorporated by reference in their entireties.

TECHNICAL FIELD

The present invention relates to a transparent rare earth aluminum garnet ceramic and specifically relates to a transparent rare earth aluminum garnet ceramic having an improved extinction ratio and an improved scattering coefficient.

BACKGROUND ART

The inventors of the present invention have put a Faraday rotator made of a polycrystalline garnet ($Tb_3Ga_5O_{12}$:TGG) ceramic having a Verdet constant substantially equivalent to that of the single crystal into practical use. The TGG, however, has a small Verdet constant in the visible light region, and thus downsizing of visible light lasers, which have been under aggressive development, is difficult. In addition, TGG is a comparatively expensive material, leading to a higher material cost.

To address these problems, single crystals of TAG ($Tb_3Al_5O_{12}$), which has a higher Verdet constant than TGG in a wavelength region from visible wavelengths to around 1,000 nm and does not contain Ga as an expensive material, have been studied. TAG is, however, an incongruent melting compound, and thus it is difficult to directly produce, from a melted composition of a starting material, TAG single crystals corresponding to the garnet phase. On this account, a Czochralski process that enables production of large single crystals is difficult to be applied, and thus TAG single crystals are produced by a floating zone method (Patent Literature 1, Non-Patent Literature 1). By the floating zone method, large single crystals are difficult to be produced. Thus, there are various problems in mass production.

Patent Literature 2 discloses a method of producing a transparent rare earth aluminum garnet ceramic by controlling the average particle diameter and the molding density of a calcined powder to improve the transparency. However, due to the low transparency and the small thickness of 0.15 cm of the sample for characteristic evaluation, the practicability is poor.

CITATION LIST

Patent Literature

Patent Literature 1: JP 4107292 B
Patent Literature 2: JP 2008-7385 A

Non-Patent Literature

Non-Patent Literature 1: Journal of Crystal Growth, 267 (2004), 188-193 (Growth of terbium aluminum garnet ($Tb_3Al_5O_{12}$; TAG) single crystals by the hybrid laser floating zone machine)

SUMMARY OF INVENTION

Technical Problem

In view of the above problems in the conventional art, an object of the present invention is to provide a transparent rare earth aluminum garnet ceramic that has a high light transmission rate and can be mass produced.

Solution to Problem

An object of the present invention can be basically achieved by the transparent rare earth aluminum garnet ceramics according to [1] and [2].

[1] A transparent rare earth aluminum garnet ceramic represented by general formula $R_3Al_5O_{12}$ (R is an element selected from the group consisting of rare earth elements having an atomic number of 65 to 71), the transparent rare earth aluminum garnet ceramic comprising Si and Y as sintering aids.

[2] A transparent rare earth aluminum garnet ceramic represented by general formula $R_3Al_5O_{12}$ (R is an element selected from the group consisting of rare earth elements having an atomic number of 65 to 70), the transparent rare earth aluminum garnet ceramic comprising Si and Lu as sintering aids.

When Si and Y are contained as sintering aids, it is preferable that Si is 5 ppm by mass to 250 ppm by mass in terms of metal, and Y is 20 ppm by mass to 600 ppm by mass in terms of metal.

When Si and Lu are contained as sintering aids, it is preferable that Si is 5 ppm by mass to 250 ppm by mass in terms of metal, and Lu is 20 ppm by mass to 600 ppm by mass in terms of metal.

It is preferable that the transparent rare earth aluminum garnet ceramic has an average crystal grain size of 0.8 to 30 µm. In the present invention, the average crystal grain size is a numerical value calculated by the following equation.

$$d = 1.56 C/(MN)$$

d: average crystal grain size (µm)
C: the length of an arbitrary line on an image captured under a scanning electron microscope
N: the number of crystal grains on the arbitrary line
M: the magnification of the image The transparent rare earth aluminum garnet ceramic of the present invention may be used as an optical component. When containing Si and Y as sintering aids, the transparent rare earth aluminum garnet ceramic of the present invention may be used as a magneto-optical component.

Advantageous Effects of Invention

The transparent rare earth aluminum garnet ceramic of the present invention contains Al in place of Ga, thus is inexpensive, comprises Si and Y as sintering aids, thus has a high light transmission rate, and can be mass produced by a burning process. In order to achieve practically excellent functions as an optical component, the ceramic preferably has, for example, an extinction ratio of 30 dB or more and a scattering coefficient of 0.4%/cm or less at wavelengths 633 nm and 1,064 nm. To provide an optical component having the above properties, the ceramic contains, as sintering aids, 5 ppm by mass to 250 ppm by mass of Si in terms of metal and 20 ppm by mass to 600 ppm by mass of Y in terms of metal, or 5 ppm by mass to 250 ppm by mass of Si in terms of metal and 20 ppm by mass to 600 ppm by mass of Lu in terms of metal. Also when the rare earth aluminum garnet ceramic has an average crystal grain size of 0.8 to 30 µm, an optical component having the above properties can be provided.

DESCRIPTION OF EMBODIMENTS

Preferred embodiments of the present invention will now be described on the basis of specific examples, but various modifications and changes may be made without departing from the technical scope of the present invention, and it goes without saying that the present invention is not limited to the following examples.

EXAMPLES

Example 1

(Preparation of Material)

Terbium oxide having a purity of 99.9% or more was dissolved in nitric acid to prepare a terbium nitrate solution having a concentration of 1 mol/L. Aluminum chloride having a purity of 99.9% or more was dissolved in ultrapure water to prepare an aluminum chloride solution having a concentration of 1 mol/L. Next, 300 mL (milliliters) of the above terbium nitrate solution, 500 mL of the above aluminum chloride solution, and 150 mL of an aqueous ammonium sulfate solution having a concentration of 1 mol/L were mixed, and ultrapure water was further added to give a total volume of 10 L of the mixed liquid. While the obtained mixed liquid was stirred, an aqueous ammonium hydrogen carbonate solution having a concentration of 0.5 mol/L was added dropwise at a rate of 5 mL/min until the pH reached 8.0, and the whole was allowed to stand under stirring at room temperature for 2 days. After the 2-day standing, suction filtration and washing with ultrapure water were repeated several times, and the product was placed in a dryer at 150° C. and dried for 2 days. The resulting precursor powder was placed in an alumina crucible and was calcined in an electric furnace at 1,200° C. for 3 hours. Through the above procedure, a terbium aluminum garnet (TAG) material powder (purity: 99.9% by mass or more) having a specific surface area of 6.0 m²/g was prepared.

(Molding and Sintering)

To 75 g of the prepared TAG material powder, 50 g of ethanol as a solvent, 0.75 g of polyvinyl alcohol (PVA) as a binder, 0.75 g of polyethylene glycol (PEG) as a plasticizer, and 0.375 g of stearic acid as a lubricant were added. Next, $SiO_2$ and $Y_2O_3$ as sintering aids were added to the TAG material powder so as to give a Si content of 100 ppm by mass and a Y content of 200 ppm by mass relative to the sintered compact in terms of metal, giving a mixed material. The mixed material was further mixed with a nylon pot and nylon balls by a ball mill for 100 hours, giving a mixed powder. The mixed powder was spray dried by a spray dryer, giving dried spherical granules. The dried spherical granules were placed in a mold with a diameter of 5 mm, then was subjected to primary molding at a pressure of 20 MPa, and was molded by cold isostatic pressing (CIP) at a pressure of 125 MPa, giving a molded article having a relative density of 59.8% determined by the Archimedes method. The molded article was heated to 600° C. at a temperature increase rate of 10° C./h and was maintained at 600° C. for 20 hours to remove the solvent, the plasticizer, and the lubricant. In order to sufficiently remove the solvent and the like, the molded article was further heated to 1,100° C. and was maintained at 1,100° C. for 10 hours. Next, the molded article was burned in a vacuum furnace at a burning temperature of 1,600° C. for 8 hours, and then was cooled to room temperature, giving a transparent rare earth aluminum garnet ceramic ($Tb_3Al_5O_{12}$, having a solid cylindrical shape with a diameter of 3 mm and a length of 25 mm). The vacuum in the vacuum furnace was $10^{-1}$ Pa, the temperature increase rate during the burning was 300° C./h, and the temperature drop rate was 300° C./h.

(Measurement of Extinction Ratio and Scattering Coefficient)

Both end faces of the ceramic were mirror polished with a diamond slurry (without an anti-reflective coating layer). When the transparent rare earth aluminum garnet ceramic of the present invention is, for example, used as a Faraday rotator for an optical isolator, an anti-reflective coating is preferably provided. The extinction ratios and the scattering coefficients of the ceramic having a solid cylindrical shape with a diameter of 3 mm and a length of 20 mm prepared as above were determined at a wavelength of 1,064 nm (YAG laser) and a wavelength of 633 nm (He—Ne laser). In the measurement of the extinction ratio, a polarizer was placed on each side of the ceramic, then the transmitted light amount was measured without application of a magnetic field, next one polarizer was rotated 90 degrees, and the extinction ratio was calculated from the ratio of a maximum value and a minimum value of the transmitted light amount.

(Calculation of Scattering Coefficient and Extinction Ratio)

The scattering coefficient was calculated by expression (1), and the extinction ratio was calculated by expression (3). For all the samples, the measurement methods and the calculation methods of the scattering coefficient and the extinction ratio are the same.

$$\text{Scattering coefficient} = [(\text{theoretical transmission rate of TAG}) - ((W_2/W_1) \times 100)]/\text{sample length (cm)} \quad (1)$$

$W_1$: laser intensity value without ceramic in optical path
$W_2$: laser intensity value with ceramic placed in optical path $$\text{Theoretical transmission rate of TAG} = [((R-1)^2/(R+1)^2) - 1]^2 \times 100 \quad (2)$$

(at a wavelength of 1,064 nm, the refractive index R is 1.844, and the theoretical transmission rate of TAG is 83.2%)
(at a wavelength of 633 nm, the refractive index R is 1.863, and the theoretical transmission rate of TAG is 82.7%)

$$\text{Extinction ratio} = 10 \times \log_{10}(W_4/W_3) \quad (3)$$

$W_3$: the minimum value of laser intensity during rotation of polarizer with ceramic in optical path
$W_4$: the maximum value of laser intensity during rotation of polarizer with ceramic placed in optical path Examples 2 to 13 and Comparative Example 1

The same procedure as in Example 1 was performed except that the contents of Si and Y relative to the sintered compact in terms of metal were changed, giving transparent rare earth aluminum garnet ceramics of Examples 2 to 13 and Comparative Example 1. The contents (ppm by mass) of Si and Y, the extinction ratios, and the scattering coefficients of the ceramics of Examples 1 to 13 and Comparative Example 1 are shown in Table 1.

TABLE 1

| Sample No. | Content (ppm by mass) Si | Content (ppm by mass) Y | Extinction ratio (dB) Measurement wavelength 633 nm | Extinction ratio (dB) Measurement wavelength 1064 nm | Scattering coefficient (%/cm) Measurement wavelength 633 nm | Scattering coefficient (%/cm) Measurement wavelength 1064 nm | Remarks |
|---|---|---|---|---|---|---|---|
| 1 | 2 | 50 | 26 | 28 | 0.7 | 0.5 | Example 2 |
| 2 | 5 | 50 | 31 | 31 | 0.4 | 0.3 | Example 3 |
| 3 | 50 | 50 | 32 | 33 | 0.4 | 0.2 | Example 4 |
| 4 | 100 | 10 | 27 | 30 | 0.9 | 0.3 | Example 5 |
| 5 | 100 | 20 | 31 | 32 | 0.3 | 0.2 | Example 6 |
| 6 | 100 | 50 | 33 | 34 | 0.3 | 0.2 | Example 7 |
| 7 | 100 | 100 | 34 | 34 | 0.3 | 0.2 | Example 8 |
| 8 | 100 | 200 | 35 | 35 | 0.3 | 0.2 | Example 1 |
| 9 | 100 | 500 | 32 | 32 | 0.3 | 0.2 | Example 9 |
| 10 | 100 | 600 | 30 | 31 | 0.4 | 0.3 | Example 10 |
| 11 | 100 | 750 | 27 | 29 | 0.9 | 0.5 | Example 11 |
| 12 | 250 | 50 | 33 | 35 | 0.3 | 0.2 | Example 12 |
| 13 | 500 | 50 | 24 | 26 | 0.8 | 0.7 | Example 13 |
| 14 | 100 | 0 | 26 | 30 | 0.9 | 0.3 | Comparative Example 1 |

As shown in Table 1, in Comparative Example 1 where the ceramic did not contain Y, the extinction ratio was 30 dB or less, and the scattering coefficient was not small. In Example 2 having a Si content of 2 ppm by mass, Example 5 having a Y content of 10 ppm, Example 11 having a Y content of 750 ppm, and Example 13 having a Si content of 500 ppm by mass, the extinction ratio was 30 dB or less, and the scattering coefficient was not small. Based on Table 1, when having a Si content of 5 ppm by mass to 250 ppm by mass and a Y content of 20 ppm by mass to 600 ppm by mass, the ceramic can achieve an extinction ratio of 30 dB or more and a scattering coefficient of 0.4%/cm or less at wavelengths 633 nm and 1,064 nm.

Examples 14 to 19

The same procedure as in Example 1 was performed except that the element Tb was replaced with Dy, Ho, Er, Tm, Yb, or Lu, giving transparent rare earth element aluminum garnet ceramics of Examples 14 to 19. The extinction ratios and the scattering coefficients of the ceramics of Examples 14 to 19 are shown in Table 2. When a specific absorption was observed at a wavelength 633 nm or 1,064 nm, the extinction ratio and the scattering coefficient were not measured.

TABLE 2

| Sample No. | Ceramic | Extinction ratio (dB) Measurement wavelength 633 nm | Extinction ratio (dB) Measurement wavelength 1064 nm | Scattering coefficient (%/cm) Measurement wavelength 633 nm | Scattering coefficient (%/cm) Measurement wavelength 1064 nm | Remarks |
|---|---|---|---|---|---|---|
| 15 | $Dy_3Al_5O_{12}$ | 35 | — | 0.3 | — | Example 14 |
| 16 | $Ho_3Al_5O_{12}$ | — | 35 | — | 0.2 | Example 15 |
| 17 | $Er_3Al_5O_{12}$ | — | 35 | — | 0.2 | Example 16 |
| 18 | $Tm_3Al_5O_{12}$ | 35 | 35 | 0.3 | 0.2 | Example 17 |
| 19 | $Yb_3Al_5O_{12}$ | 35 | — | 0.3 | — | Example 18 |
| 20 | $Lu_3Al_5O_{12}$ | 35 | 35 | 0.3 | 0.2 | Example 19 |

As shown in Table 2, $Tm_3Al_5O_{12}$ of Example 17 and $Lu_3Al_5O_{12}$ of Example 19 achieve an extinction ratio of 35 dB and a scattering coefficient of 0.3%/cm or less at wavelengths of 633 nm and 1,064 nm.

Examples 20 to 25

The same procedure as in Example 1 was performed except that the pressure at the time of molding by CIP was changed to alter the relative density of the molded article by the Archimedes method, giving transparent rare earth aluminum garnet ceramics of Examples 20 to 25. The molding pressures by CIP, the relative densities, the extinction ratios, and the scattering coefficients of the ceramics of Examples 20 to 25 are shown in Table 3.

TABLE 3

| Sample No. | Molding pressure (MPa) | Relative density (%) | Extinction ratio (dB) | | Scattering coefficient (%/cm) | | Remarks |
|---|---|---|---|---|---|---|---|
| | | | Measurement wavelength 633 nm | Measurement wavelength 1064 nm | Measurement wavelength 633 nm | Measurement wavelength 1064 nm | |
| 21 | 30 | 48.3 | 24 | 25 | 2.0 | 1.5 | Example 20 |
| 22 | 50 | 50.7 | 25 | 27 | 1.2 | 1.1 | Example 21 |
| 23 | 85 | 53.9 | 28 | 29 | 1.0 | 0.8 | Example 22 |
| 24 | 100 | 55.3 | 34 | 34 | 0.4 | 0.3 | Example 23 |
| 25 | 130 | 60.5 | 35 | 35 | 0.3 | 0.2 | Example 24 |
| 26 | 150 | 63.2 | 35 | 35 | 0.3 | 0.2 | Example 25 |

As shown in Table 3, in Examples 20, 21, and 22 having a relative density of 48.3 to 53.9(%), the extinction ratio was 29 dB or less, and the scattering coefficient was not small. In contrast, in Examples 23, 24, and 25 having a relative density of 55.3 to 63.2(%), the extinction ratio was 34 dB or more, and the scattering coefficient was 0.4%/cm or less at wavelengths of 633 nm and 1,064 nm.

Examples 26 to 35

The same procedure as in Example 1 was performed except that the burning temperature and the burning time were changed, giving transparent rare earth aluminum garnet ceramics of Examples 26 to 35. The burning temperatures, the burning times, the average crystal grain sizes, the extinction ratios, and the scattering coefficients of the ceramics of Examples 26 to 35 are shown in Table 4. The burning time is the holding time at a burning temperature. No dense ceramic was obtained at a burning temperature of 1,300° C., and thus the extinction ratio and the scattering coefficient were not measured. The average crystal grain sizes in Table 4 are numerical values calculated by the expression described in paragraph 0011.

TABLE 4

| Sample No. | Burning temperature (° C.) | Burning time (h) | Average crystal grain size (μm) | Extinction ratio (dB) | | Scattering coefficient (%/cm) | | Remarks |
|---|---|---|---|---|---|---|---|---|
| | | | | Measurement wavelength 633 nm | Measurement wavelength 1064 nm | Measurement wavelength 633 nm | Measurement wavelength 1064 nm | |
| 27 | 1300 | 8 | 0.4 | — | — | — | — | Example 26 |
| 28 | 1400 | 8 | 0.6 | 18 | 21 | 5.0 | 3.5 | Example 27 |
| 29 | 1500 | 8 | 0.8 | 32 | 30 | 0.4 | 0.4 | Example 28 |
| 30 | 1600 | 0.2 | 0.6 | 23 | 25 | 2.2 | 1.6 | Example 29 |
| 31 | 1600 | 0.5 | 1.2 | 30 | 30 | 0.4 | 0.4 | Example 30 |
| 32 | 1600 | 1 | 2.0 | 31 | 31 | 0.4 | 0.4 | Example 31 |
| 33 | 1600 | 5 | 7.2 | 33 | 35 | 0.4 | 0.3 | Example 32 |
| 34 | 1650 | 8 | 15 | 35 | 35 | 0.3 | 0.2 | Example 33 |
| 35 | 1700 | 8 | 30 | 34 | 35 | 0.3 | 0.2 | Example 34 |
| 36 | 1750 | 8 | 35 | 27 | 29 | 1.0 | 0.8 | Example 35 |

As shown in Table 4, in Example 27 in which the burning temperature was 1,400° C., Example 29 in which the burning time was 0.2 hour at 1,600° C., and Example 35 in which the burning temperature was 1,750° C., the extinction ratio was 29 dB or less, and the scattering coefficient was not small. In contrast, in Examples 28 and 30 to 34 in which the burning temperature was 1,500 to 1,700° C. and the burning time was 0.5 to 8 hours, the extinction ratio was 30 dB or more, and the scattering coefficient was 0.4%/cm or less at wavelengths 633 nm and 1,064 nm.

Examples 36 to 48

The same procedure as in Example 1 was performed except that hot isostatic pressing (HIP) was performed after the burning step, giving transparent rare earth aluminum garnet ceramics of Examples 36 to 48. The temperatures and the pressures by HIP, the extinction ratios, and the scattering coefficients of the ceramics of Examples 36 to 48 are shown in Table 5. The treatment time of HIP was 3 hours.

TABLE 5

| Sample No. | Temperature (° C.) | Pressure (MPa) | Extinction ratio (dB) | | Scattering coefficient (%/cm) | | Remarks |
| --- | --- | --- | --- | --- | --- | --- | --- |
| | | | Measurement wavelength 633 nm | Measurement wavelength 1064 nm | Measurement wavelength 633 nm | Measurement wavelength 1064 nm | |
| 37 | 1250 | 196 | 35 | 35 | 0.3 | 0.2 | Example 36 |
| 38 | 1350 | 100 | 38 | 38 | 0.2 | 0.1 | Example 37 |
| 39 | 1350 | 150 | 38 | 38 | 0.2 | 0.1 | Example 38 |
| 40 | 1450 | 100 | 40 | 41 | 0.2 | 0.1 | Example 39 |
| 41 | 1450 | 150 | 41 | 42 | 0.2 | 0.1 | Example 40 |
| 42 | 1550 | 100 | 43 | 44 | 0.2 | 0.1 | Example 41 |
| 43 | 1550 | 150 | 44 | 45 | 0.1 | 0.1 | Example 42 |
| 44 | 1600 | 40 | 35 | 35 | 0.3 | 0.2 | Example 43 |
| 45 | 1650 | 100 | 45 | 47 | 0.1 | 0.1 | Example 44 |
| 46 | 1650 | 150 | 46 | 48 | 0.1 | 0.1 | Example 45 |
| 47 | 1700 | 100 | 44 | 46 | 0.2 | 0.1 | Example 46 |
| 48 | 1700 | 150 | 42 | 43 | 0.2 | 0.1 | Example 47 |
| 49 | 1750 | 100 | 25 | 28 | 0.8 | 0.6 | Example 48 |

As shown in Table 5, by HIP at a temperature of 1,250 to 1,700° C. at a pressure of 40 to 196 MPa for 3 hours (Examples 36 to 47), an extinction ratio of 35 dB or more and a scattering coefficient of 0.3%/cm or less at wavelengths 633 nm and 1,064 nm can be achieved. However, when HIP was performed at an excessively high temperature of 1,750° C. (Example 48), the extinction ratio was 28 dB or less, and the scattering coefficient was not small.

Examples 49 to 57 and Comparative Example 2

The same procedure as in Example 1 was performed except that the contents of Si and Lu relative to the sintered compact in terms of metal were changed, giving transparent rare earth aluminum garnet ceramics of Examples 49 to 57 and Comparative Example 2. The contents (ppm by mass) of Si and Lu, the extinction ratios, and the scattering coefficients of the ceramics of Examples 49 to 57 and Comparative Example 2 are shown in Table 6.

TABLE 6

| Sample No. | Content (ppm by mass) | | Extinction ratio (dB) | | Scattering coefficient (%/cm) | | Remarks |
| --- | --- | --- | --- | --- | --- | --- | --- |
| | Si | Lu | Measurement wavelength 633 nm | Measurement wavelength 1,064 nm | Measurement wavelength 633 nm | Measurement wavelength 1,064 nm | |
| 50 | 2 | 50 | 25 | 27 | 0.9 | 0.6 | Example 49 |
| 51 | 5 | 50 | 30 | 30 | 0.4 | 0.3 | Example 50 |
| 52 | 100 | 10 | 28 | 30 | 0.9 | 0.4 | Example 51 |
| 53 | 100 | 20 | 30 | 31 | 0.4 | 0.3 | Example 52 |
| 54 | 100 | 100 | 34 | 34 | 0.3 | 0.2 | Example 53 |
| 55 | 100 | 600 | 30 | 31 | 0.4 | 0.3 | Example 54 |
| 56 | 100 | 750 | 27 | 28 | 0.9 | 0.4 | Example 55 |
| 57 | 250 | 50 | 32 | 34 | 0.3 | 0.2 | Example 56 |
| 58 | 500 | 50 | 25 | 27 | 0.9 | 0.6 | Example 57 |
| 59 | 100 | 0 | 26 | 29 | 0.9 | 0.4 | Comparative Example 2 |

As shown in Table 6, in Comparative Example 2 where the ceramic did not contain Lu, the extinction ratio was 29 dB or less, and the scattering coefficient was not small. In Example 49 having a Si content of 2 ppm by mass, Example 51 having a Lu content of 10 ppm, Example 55 having a Lu content of 750 ppm, and Example 57 having a Si content of 500 ppm by mass, the extinction ratio was 30 dB or less, and the scattering coefficient was not small. Based on Table 1, when having a Si content of 5 ppm by mass to 250 ppm by mass and a Lu content of 20 ppm by mass to 600 ppm by mass, the ceramics can achieve an extinction ratio of 30 dB or more and a scattering coefficient of 0.4%/cm or less at wavelengths 633 nm and 1,064 nm.

INDUSTRIAL APPLICABILITY

The transparent rare earth aluminum garnet ceramic of the present invention can be used as a Faraday rotator for an optical isolator.

The invention claimed is:

1. A transparent rare earth aluminum garnet ceramic represented by molecular formula $R_3Al_5O_{12}$ wherein R is an element selected from the group consisting of rare earth elements having an atomic number of 65 to 70, and wherein the transparent rare earth aluminum garnet ceramic comprises at least two sintering aids comprising Si and Lu, and wherein the transparent rare earth aluminum garnet ceramic contains 5 ppm by mass to 250 ppm by mass of Si in terms of metal and 20 ppm by mass to 600 ppm by mass of Lu in terms of metal.

* * * * *